(12) United States Patent  
Geiger

(10) Patent No.: US 8,537,122 B2
(45) Date of Patent: Sep. 17, 2013

(54) TOUCH SCREEN ADAPTER FOR MONITOR

(75) Inventor: Avi Geiger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 12/145,479

(22) Filed: Jun. 24, 2008

(65) Prior Publication Data
US 2009/0315837 A1    Dec. 24, 2009

(51) Int. Cl.
*G06F 3/041* (2006.01)

(52) U.S. Cl.
USPC ...................................... 345/173; 361/679.21

(58) Field of Classification Search
USPC ..................................... 345/173; 361/679.21
See application file for complete search history.

(56) References Cited

U.S. PATENT DOCUMENTS

| 4,675,569 | A | | 6/1987 | Bowman et al. |
| 4,918,262 | A | * | 4/1990 | Flowers et al. ............... 345/173 |
| 5,835,080 | A | | 11/1998 | Beeteson et al. |
| 6,504,530 | B1 | * | 1/2003 | Wilson et al. ................. 345/173 |
| 6,766,994 | B2 | | 7/2004 | Serbinski et al. |
| 7,206,038 | B2 | | 4/2007 | Choi et al. |
| 7,270,383 | B2 | | 9/2007 | McElheney |
| 2005/0075168 | A1 | | 4/2005 | Martin |
| 2006/0209041 | A1 | * | 9/2006 | Studt et al. ..................... 345/173 |
| 2007/0236473 | A1 | | 10/2007 | Hong et al. |
| 2007/0244598 | A1 | | 10/2007 | Shoenfeld |
| 2007/0279850 | A1 | * | 12/2007 | Chiang et al. ................. 361/681 |
| 2008/0023612 | A1 | | 1/2008 | Lum |

OTHER PUBLICATIONS

"8.4" Industrial Panel Mount Monitor", Trident Microsystems Ltd, 2007, p. 1.
Inglis, "Hate mixing by mouse? Intatouch's neat monitor add-on allows you to draw control data directly onto the screen", Mar. 2006, SOS Publications Group, pp. 2.
"Touchscreen Panel PC's", retrieved at <<http://www.impulse-corp.co.uk/display_category.asp?id=26&cat=4>, pp. 2.

* cited by examiner

*Primary Examiner* — Jonathan Boyd
(74) *Attorney, Agent, or Firm* — Michael B Dodd; Dodd Law Group

(57) ABSTRACT

A touchscreen adapter may fit between a display and a display mount and may resolve the presence and position of a touch to the surface of the display. In some embodiments, the touchscreen adapter may sense using a strain gage sensor mechanism. The touchscreen adapter may have a male mechanical interface to the display and a female mechanical interface to the display mount. In some embodiments, the two mounts may be the same size and format, enabling the touchscreen adapter to be inserted between a display and display mount for a given display. The touchscreen adapter may provide an electronic interface to a computer system to transmit a presence and position of a touch made to the display.

20 Claims, 8 Drawing Sheets

100 MONITOR WITH TOUCHSCREEN ADAPTER

700
ELECTRICAL FUNCTIONAL
COMPONENTS OF A TOUCHSCREEN
ADAPTER

TOUCH SCREEN ADAPTER FOR MONITOR

BACKGROUND

Touchscreen interfaces are used in many applications, from cellular telephones to point of sale kiosks. Touchscreen devices enable a user to interact with a display device by pointing or touching the surface of the display.

Several different technologies may be used in touchscreen devices. Two commonly used technologies are resistive touchscreens and capacitive touchscreens. A resistive touchscreen is one in which the resistance change between two translucent sheets is measured when a user presses a point on a display. A capacitive touchscreen measures the capacitive change between a user's finger or stylus and the surface of a display to detect the presence and position of the touch. In both cases, the touchscreen sensor is placed over the surface of the display.

SUMMARY

A touchscreen adapter may fit between a display and a display mount and may resolve the presence and position of a touch to the surface of the display. In some embodiments, the touchscreen adapter may sense a touch using a strain gage sensor mechanism or a displacement sensor mechanism. The touchscreen adapter may have a male mechanical interface to the display and a female mechanical interface to the display mount. In some embodiments, the two mounts may be the same size and format, enabling the touchscreen adapter to be inserted between a display and display mount for a given display. The touchscreen adapter may provide an electronic interface to a computer system to transmit a presence and position of a touch made to the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
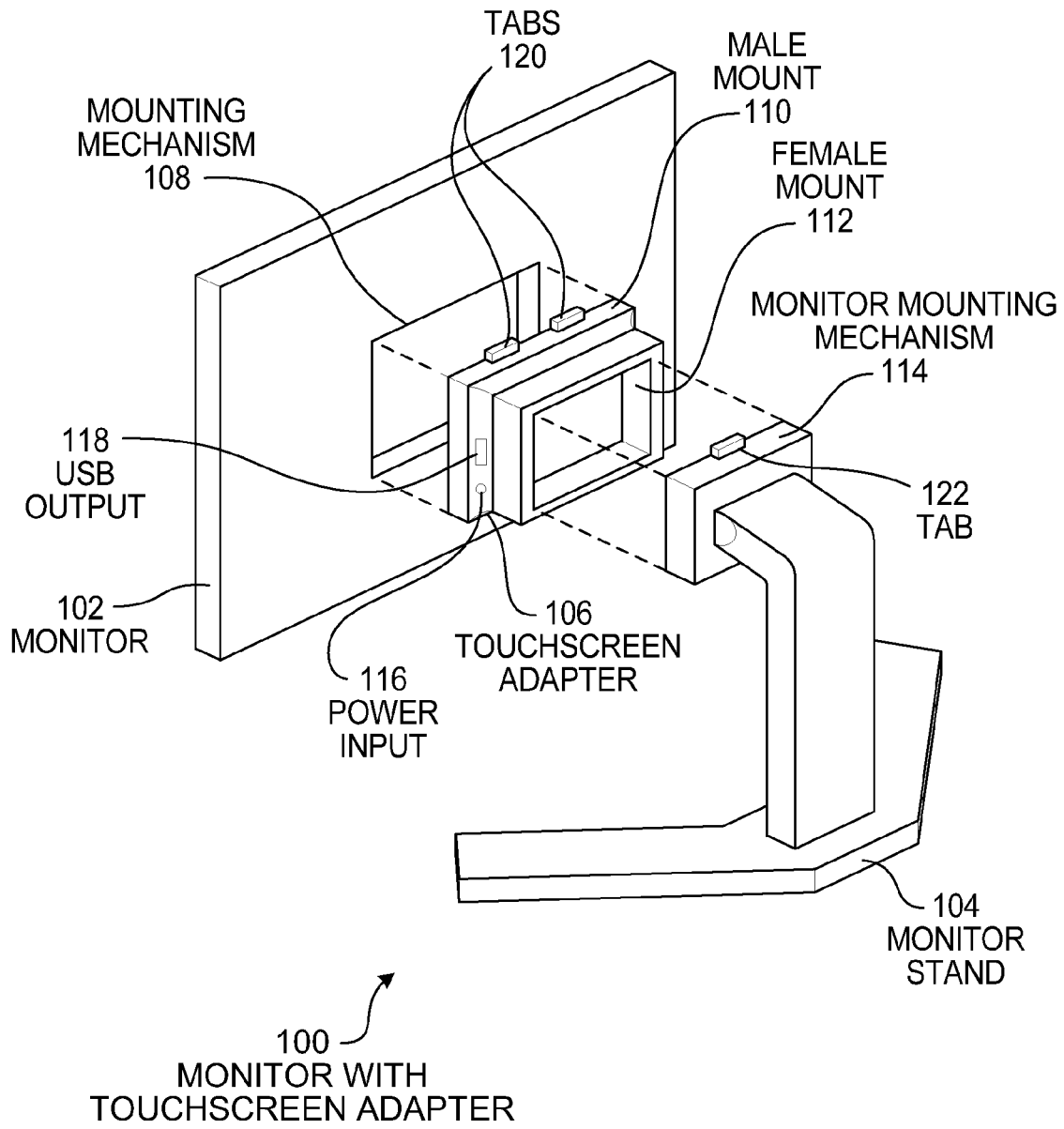
FIG. 1 is a perspective illustration of an embodiment showing a monitor with a touchscreen adapter.

A touchscreen adapter may use force or displacement sensing to determine the location of a touch on a display. The touchscreen adapter may attach to the rear of a monitor and may fit between the monitor and any mounting device. In some embodiments, the touchscreen adapter may have a male/female arrangement so that the adapter may be inserted between an existing monitor and monitor mount to add touchscreen capabilities to a non-touchscreen monitor.

The touchscreen adapter may use standard mounting configurations, such as those promulgated by the Video Electronics Standards Association (VESA) or other groups. In other cases, any other type of mechanical interface may be used.

In a typical VESA standard monitor mount, such as the VESA Flat Display Mounting Interface (FDMI), four screws are used to connect a mounting device to a monitor. Some manufacturers of monitors may have a VESA compliant mechanical interface and may also enable other types of proprietary or standardized mechanical interfaces. Many such interfaces may include various mechanical engagements in addition to or instead of VESA compliant mounting mechanisms.

The touchscreen adapter may receive force inputs created by a user touching the monitor. The adapter may sense the force inputs using strain gages, displacement transducers, or some other mechanism, and may resolve the touch into a horizontal and vertical position with respect to the monitor. The position information may be communicated to a computer or other device and used as an input to the device.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a perspective exploded diagram of an embodiment 100 showing a monitor with a touchscreen adapter. Embodiment 100 is an example of a touchscreen adapter that may be used to convert a monitor to a touchscreen input device. Embodiment 100 is also an example of a touchscreen adapter that may adapt a monitor stand with one mounting mechanism to a monitor with a different mounting mechanism.

Embodiment 100 is an exploded view of a monitor 102, a monitor stand 104, and a touchscreen adapter 106. The monitor 102 may have a display surface that is not shown in FIG. 1, as the view of monitor 102 is from the rear.

The monitor 102 may be any type of monitor device, including various flat panel monitor types that may use various technologies such as LCD or plasma. In some cases, the monitor 102 may be a cathode ray tube or other, non-flat panel technologies.

The monitor stand 104 may be any type of mounting device. The monitor stand 104 as illustrated may be used on a desktop for supporting the monitor 102. In other embodiments, the monitor stand 104 may be a wall mounted device. In many embodiments, the monitor stand 104 may have various positioning capabilities to raise, lower, and rotate the monitor 102 in one or more axes. In many embodiments, such positioning capabilities may include a mechanism to lock the monitor in a particular position.

The monitor 102 may have a mounting mechanism 108 through which a mechanical connection may be made to the touchscreen adapter 106. The touchscreen adapter 106 may have a male mount 110 that may include two tabs 120 that may fit into recesses within the mounting mechanism 108.

The touchscreen adapter 106 may have a female mount 112 that may receive the monitor mounting mechanism 114. The monitor mounting mechanism 114 may include a tab 122 that may fit into a recess within the female mount 112.

The touchscreen adapter 106 may adapt between one type or size of mounting mechanism and another type or size of mounting mechanism. In embodiment 100, the touchscreen adapter 106 may connect to a monitor stand 104 using a small size female mount 112 that engages a single tab 122, and may connect to a monitor 102 that may have a larger mounting mechanism 108 that has two tabs 120.

In some embodiments, the touchscreen adapter 106 may adapt between a smaller mounting mechanism to a monitor and a larger mounting mechanism to a stand.

In still other embodiments, the touchscreen adapter 106 may connect between a monitor and a monitor stand, each having the same mounting mechanisms. In such a case, the touchscreen adapter 106 may be added to an existing monitor and monitor stand combination and may be used to convert a non-touchscreen monitor to a touchscreen enabled monitor.

The touchscreen adapter 106 may operate by sensing force or displacement changes between the male mount 110 and the female mount 112. The touchscreen adapter 106 may use strain gages, displacement sensors, or other technologies to measure the presence and position of a touch on the display surface of the monitor 102.

The resolution and accuracy of the touchscreen adapter 106 may be dependent on several factors, including the sensitivity of the strain gages or other sensors, the calibration mechanism, and the rigidity of the mounting mechanisms and monitor stand 104. In some embodiments, other factors may also contribute to resolution and accuracy of the touchscreen adapter 106, including user technique, mounting positions, and other factors.

The touchscreen adapter 106 may have a power input 116 and may have a Universal Serial Bus output 118. Other embodiments may have different mechanisms for supplying power and receiving output from the touchscreen adapter 106. For example, in some cases, a Universal Serial Bus output 118 may also be used to supply power to the touchscreen adapter 106. In another example, the touchscreen adapter 106 may use battery or hardwire power input and communicate an output signal using a wireless technology such as IEEE 802.15, commonly known as Bluetooth.

The touchscreen adapter 106 may include a processor and various electronics that may sense a touch input and resolve the touch input to a position on the monitor. The position and presence information may be transmitted using the Universal Serial Bus output 118 or another mechanism. In some embodiments, such electronics may be housed within the touchscreen adapter 106 or may be external to the touchscreen adapter.

Figure 2:
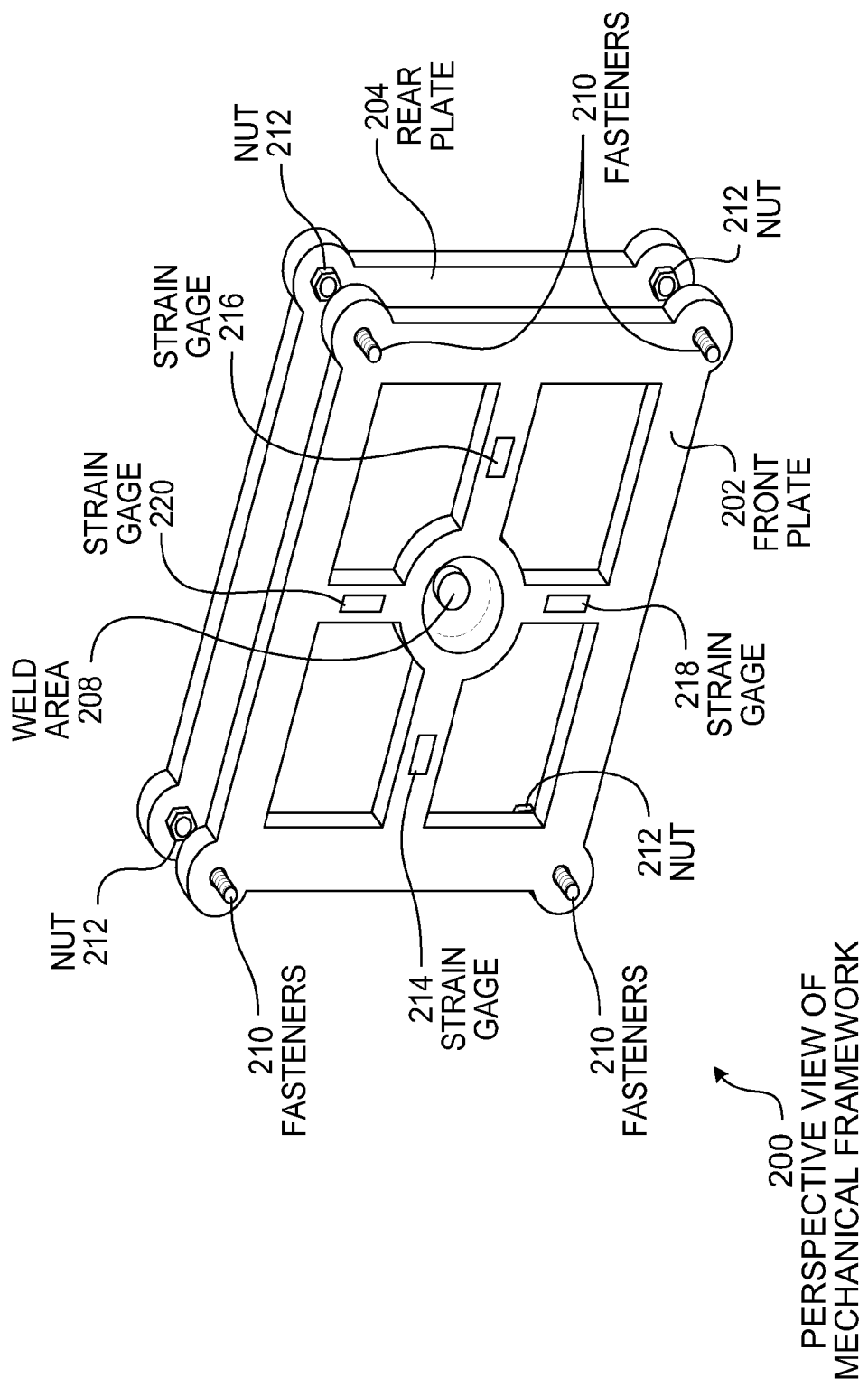
FIG. 2 is a perspective illustration of an embodiment showing a mechanical framework of a touchscreen adapter.

FIG. 2 is a perspective diagram of an embodiment 200 showing a mechanical framework for a touchscreen adapter. Embodiment 200 is a simplified example of one version of a mechanical framework that may be used to connect a monitor stand to a monitor and sense any touches made on the monitor screen.

Embodiment 200 is also an example of a male/female arrangement that may have mechanically reciprocal arrangements on either side of the framework. Such a configuration may enable the framework of embodiment 200 to be inserted between a monitor and a monitor stand to convert a non-touchscreen monitor to a touchscreen monitor.

The mechanical framework of embodiment 200 may be used with a shroud or other external cover in a typical consumer product.

Embodiment 200 does not illustrate any electronics that may be used to collect force information, resolve various position and presence information from the force information, and transmit the position and presence information to another device.

Embodiment 200 is an example of a mechanical framework that may be use multiple strain gages to sense the presence and position of a touch to a monitor. Other embodiments may use various positional sensors that may be used to sense displacement of the front plate 202 with respect to the rear plate 204.

The front plate 202 and rear plate 204 may mount to either a monitor or a monitor stand. In a typical VESA FDMI compliant version, the front plate 202 may engage a monitor while the rear plate 204 may engage a monitor stand. Other embodiments may be differently configured.

The front plate 202 may have several fasteners 210 that may engage a monitor. The fasteners 210 may have a head located between the front plate 202 and rear plate 204. The fastener head may have a knurled exterior for finger tightening or may have a tool engagement mechanism for turning the fastener with a tool. Such mechanisms may include a hex recess, Torx recess, external hex, or some other mechanism.

The rear plate 204 may have several nuts 212 that may be pressed into the rear plate 204. The nuts 212 may have female threads that correspond to threads on the fasteners 210.

In a VESA FDMI arrangement, the mechanical interface to a monitor or monitor stand may be in the form of four screws laid out in a rectangular or square pattern. In a typical VESA FDMI arrangement, male threads on a monitor mount may engage corresponding female threads on a monitor. The VESA FDMI arrangements specify several different sizes and positions of the fasteners, and other standardized or proprietary mechanical interfaces may have different configurations.

The front plate 202 and rear plate 204 are joined together by a weld area 208. The weld area may be in a recess in the front plate 202. The front plate 202 and rear plate 204 may be joined by other mechanisms, including fasteners and other mechanisms.

The front plate 202 and rear plate 204 may be fashioned from stamped sheet metal. Other embodiments may use machined metal components, cast metal components, or component created by molding, forming, bonding, or machining plastic materials including reinforced thermoset and thermoplastic materials.

In some embodiments, the front plate 202 and rear plate 204 may be integrally formed using a casting or molding process.

The front plate 202 may have four cut out areas that form four arms on which strain gages 214, 216, 218, and 220 are placed. The strain gages 214, 216, 218, and 220 may be used to measure any deflection between the front plate 202 and rear plate 204 and resolve the position and intensity of the force applied to create the deflection.

In many embodiments, the strain gages 214, 216, 218, and 220 may be detect miniscule changes in the strain of the front plate 202. Such strain may be the result of very small deflections between the front plate 202 and the rear plate 204. The design of the front plate 202 is such that the arms on which the various strain gages are placed will deflect more readily than other portions of the embodiment 200, enabling the strain gages to sense any forces applied between the front plate 202 and rear plate 204.

The strain gages 214, 216, 218, and 220 may be arranged so that the both the position and magnitude of a force applied to a monitor may be resolved. Various arrangements of strain gages and various designs of the sensing circuitry may be used.

Figure 3:
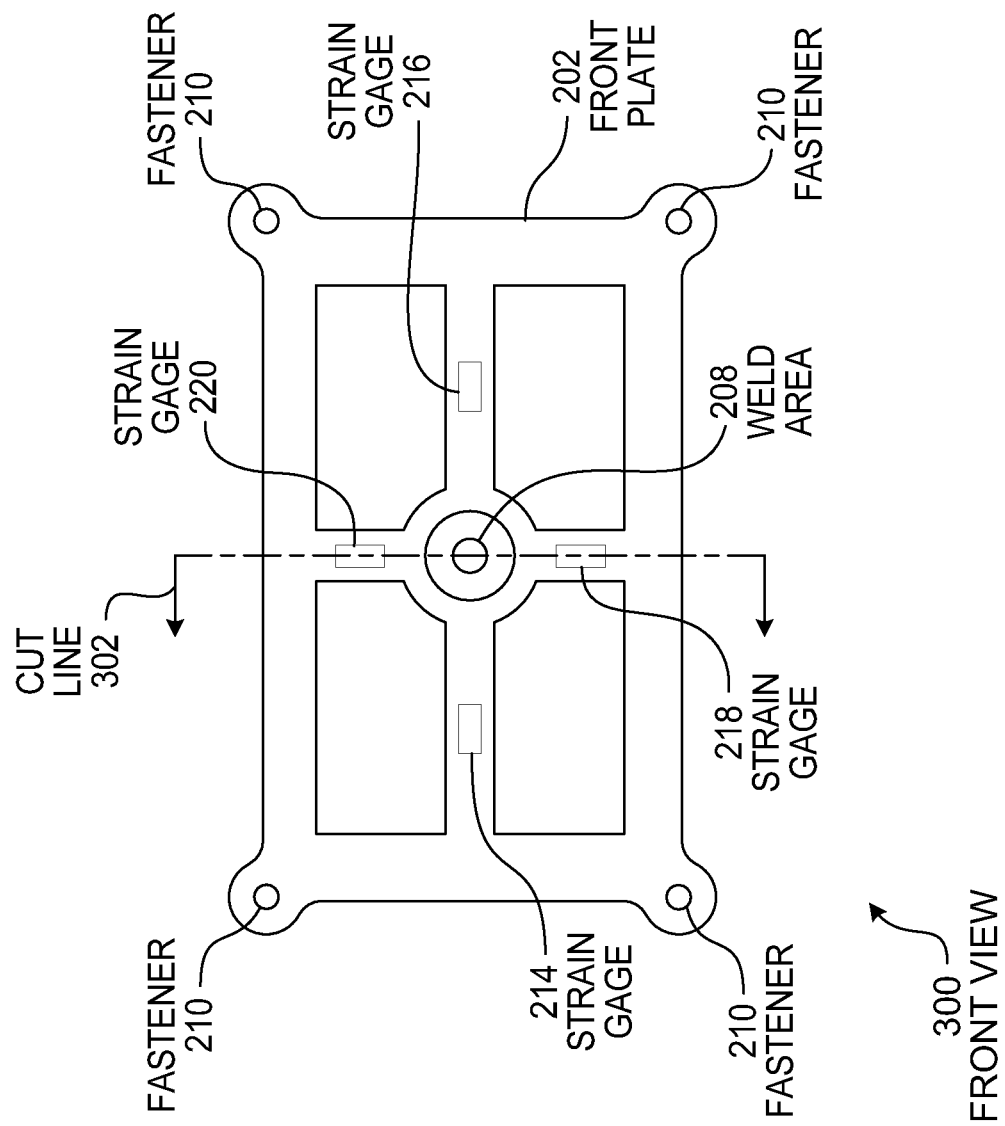
FIG. 3 is a front view illustration of the embodiment of FIG. 2 showing a mechanical framework of a touchscreen adapter.

FIG. 3 is a front view illustration 300 of the embodiment 200. The front view illustration 300 shows front plate 202 and the locations of fasteners 210 in a rectangular pattern. The front plate 202 has four cut out areas that form four arms on which strain gages 214, 216, 218, and 220 are mounted. The weld area 208 is located at the center of the four arms.

The front plate 202 is designed with four relatively thin arms on which the various strain gages are mounted. The front plate 202 has a relatively thicker area about the periphery that may be more rigid than the four arms. As force is applied to the front plate 202 through a connection to a monitor near the fasteners 210, the four arms containing the strain gages may bend or deflect slightly. The deflection or strain may be captured by the strain gages 214, 216, 218, and 220 and resolved using electronics to determine the presence and position of a force applied to a monitor.

Figure 4:
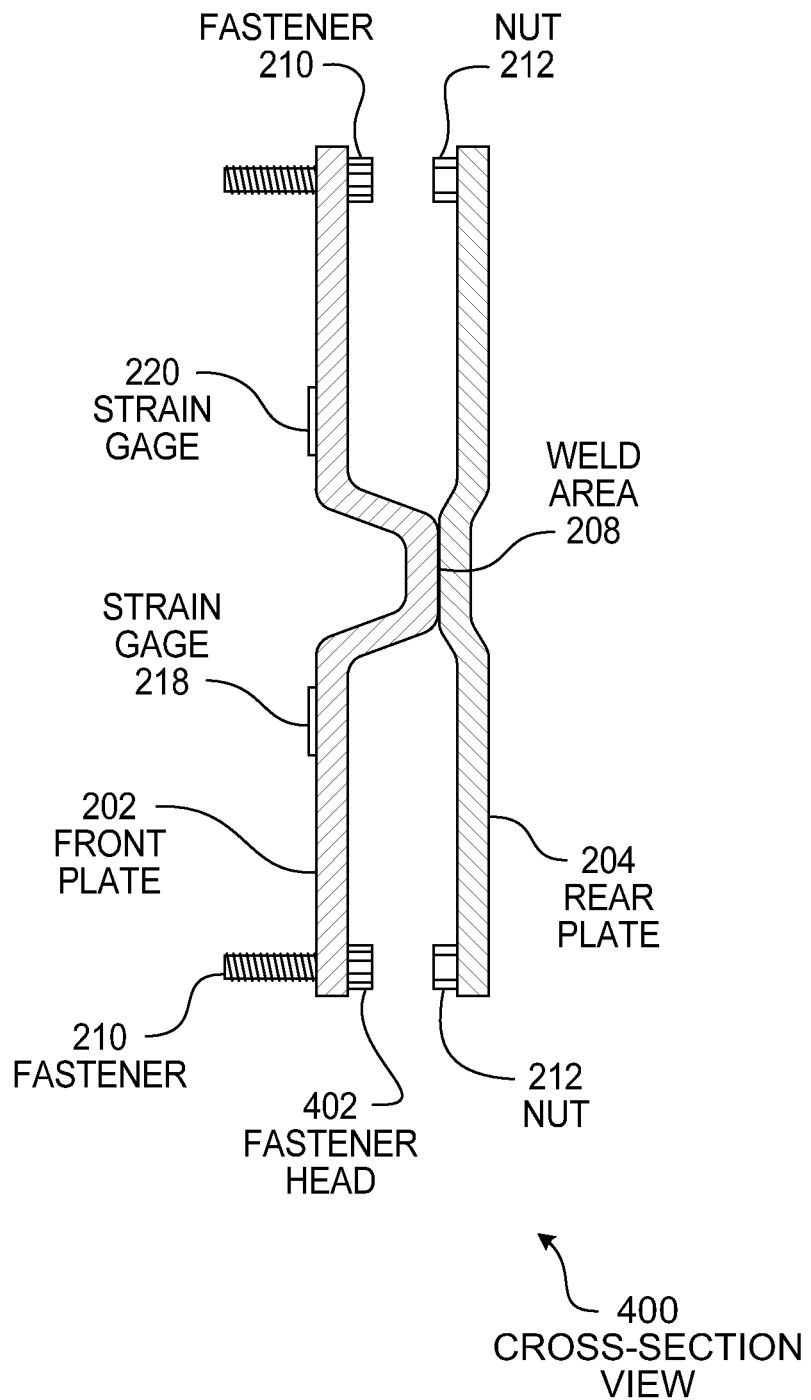
FIG. 4 is a cross-section illustration of the embodiment of FIG. 2 showing a mechanical framework of a touchscreen adapter.

FIG. 4 is a cross-section view 400 of embodiment 200 taken at the cut line 302.

The cross-section view 400 illustrates the front plate 202 and rear plate 204. In the weld area 208, the front plate 202 and rear plate 204 may have a dimple or other formed feature that enables the generally planar surfaces of the front plate 202 and rear plate 204 to be positioned away from each other.

The front plate 202 may have fasteners 210 attached. In many embodiments, the fastener head 402 may be knurled to provide grip for finger tightening the fastener 210. In some embodiments, the fastener head 402 may have a recess for a hex tool, Torx, or some other type of tool.

The nuts 212 may be press fit into the rear plate 204 and may receive fasteners from a monitor stand or other mounting device. In embodiments where a male/female arrangement is used with the framework 200, the axis of the nuts 212 may align with the axis of the corresponding fasteners 210.

Figure 5:
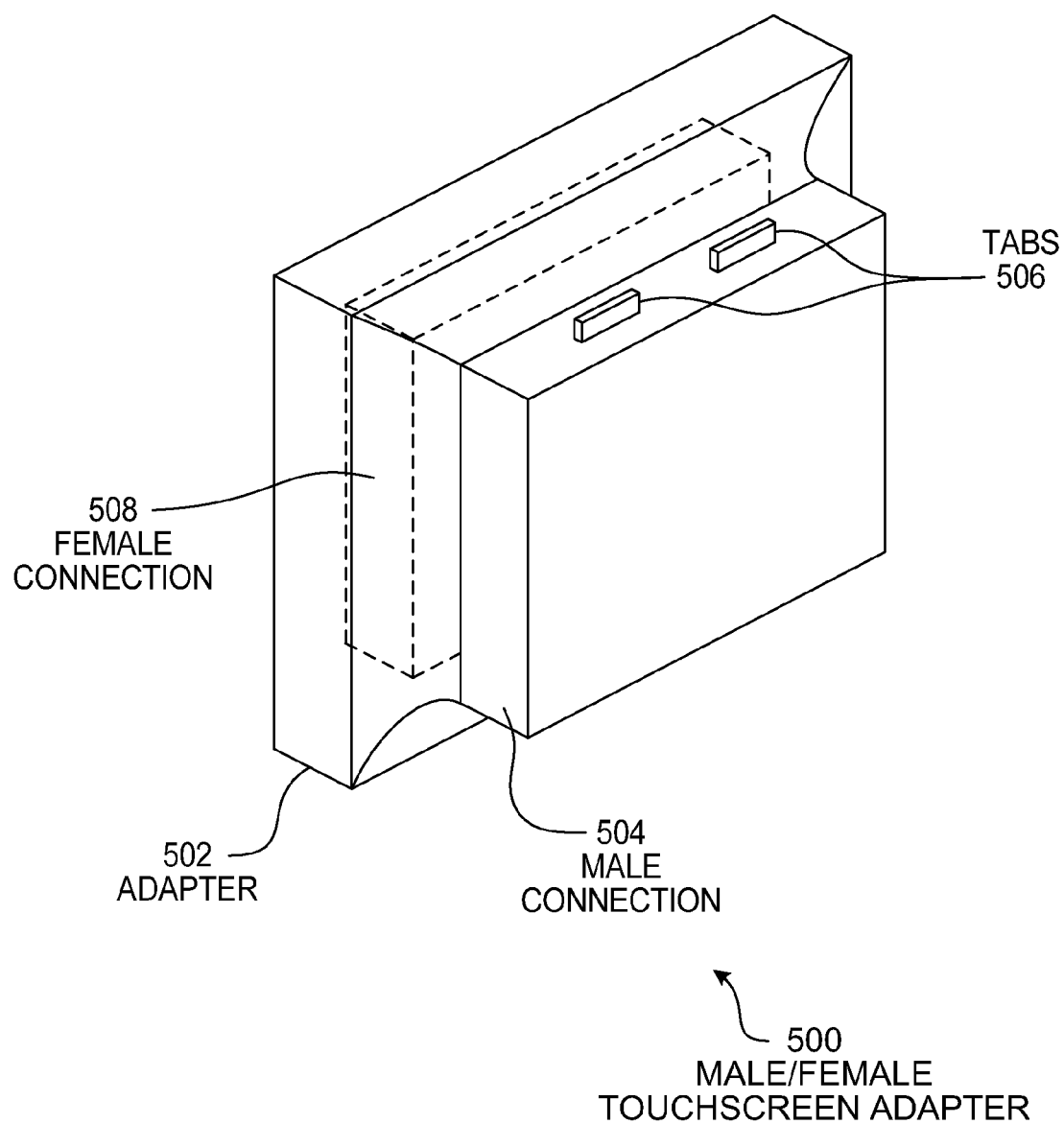
FIG. 5 is a perspective illustration of an embodiment showing a male/female touchscreen adapter.

FIG. 5 is a perspective illustration of an embodiment 500 showing a male/female touchscreen adapter 502. Embodiment 500 may use a square or rectangular mechanical interface to corresponding male and female interfaces for a monitor or monitor stand.

The male connection 504 may have two tabs 506 that may engage corresponding recesses in a mating component. The touchscreen adapter 502 may also have a corresponding female connection 508 that may engage a corresponding male connection in a mating component.

The adapter 502 may be constructed so that sensors within the adapter 502 are arranged to sense forces applied between the male connection 504 and female connection 508. The adapter 502 may have an internal mechanical framework that may carry the mechanical loads between the male connection 504 and female connection 508. The adapter 502 may have a cosmetic shroud or cover that may be used for aesthetic reasons.

Figure 6:
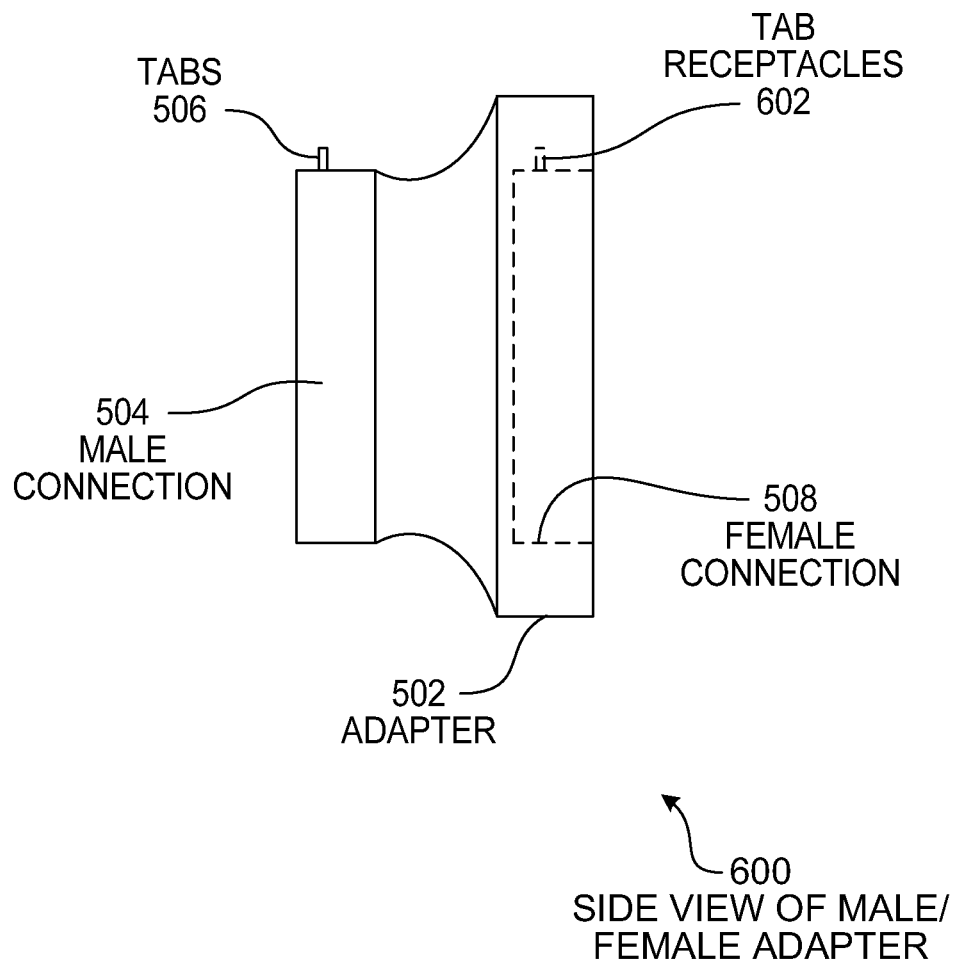
FIG. 6 is a side view illustration of the embodiment of FIG. 5 showing a male/female touchscreen adapter.

FIG. 6 is a side view illustration 600 of the embodiment 500. The male connection 504 is illustrated with the tabs 506, and the female connection 508 is illustrated with tab receptacles 602 that may receive tabs corresponding to the tabs 506.

The adapter 502 is an illustration of a consumer product that may be used to convert a non-touchscreen monitor to a touchscreen enabled monitor. The adapter 502 may have Bluetooth or other wireless connection to a computer or other device to transmit presence and position of touches made to an attached monitor. In some embodiments, the adapter 502 may connect to a device using a hardwired connection, such as Universal Serial Port.

In some embodiments, the adapter 502 may provide sensor information that may be translated and resolved by an external computing device to determine presence and position of a force applied to a monitor.

Figure 7:
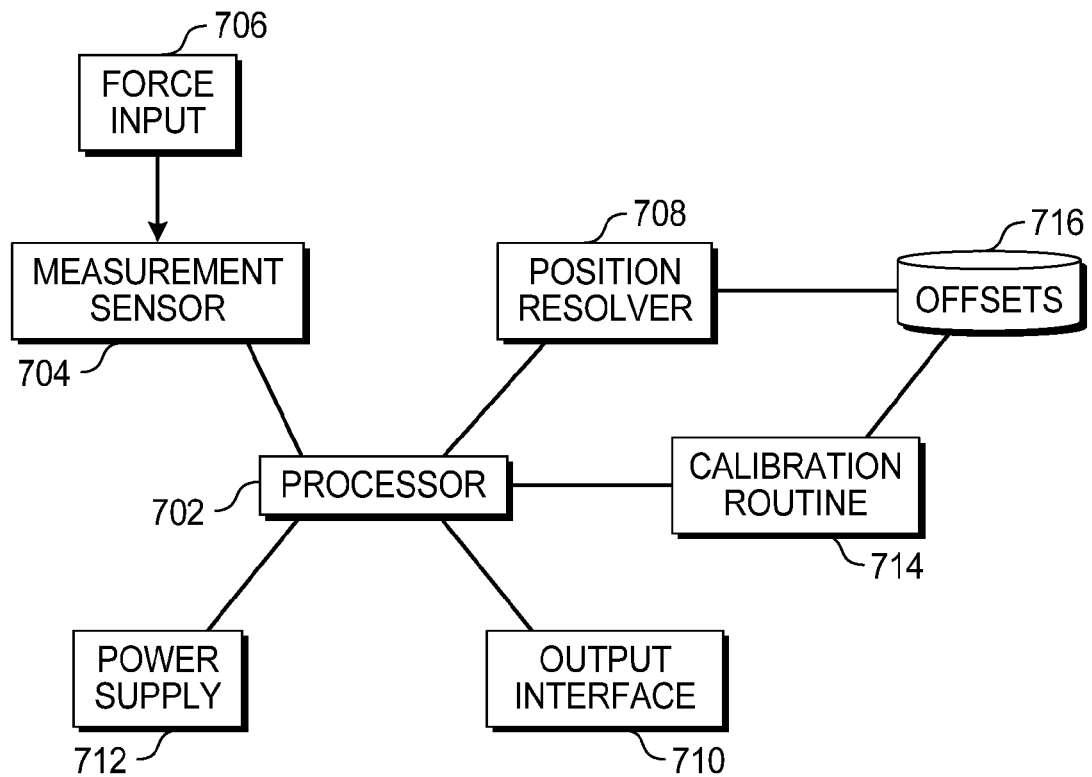
FIG. 7 is a diagram illustration of an embodiment showing various electrical functional components of a touchscreen adapter.

FIG. 7 is a diagram illustration of an embodiment 700 showing some electrical functional components of a touchscreen adapter. Embodiment 700 illustrates a simplified example of the various functions that may be performed inside some embodiments of a touchscreen adapter.

The diagram of FIG. 7 illustrates functional components of a system. In some cases, the component may be a hardware component, a software component, or a combination of hardware and software. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 700 may contain a processor 702 that may receive output from measurement sensors 704 when a force input 706 is applied. The processor 702 may use a position resolver function 708 that may determine the position of the applied force input 706 with respect to a monitor, and may transmit the position information using an output interface 710.

Each embodiment may have different mechanisms for sensing a force input 706 and resolving a position for the force input 706. In some cases, various displacement sensors, strain gages, or other sensors may be used as the measurement sensors 704.

In some embodiments, the position resolver 708 may be a software program that operates on the processor 702. In other embodiments, the position resolver 708 may be a hardware device that may accept input from the measurement sensors 704 and resolve a position.

The output interface 710 may be any type of communications interface, including hardwired and wireless interface. An example of a hardwired interface may be a serial interface such as RS-232 or Universal Serial Bus. An example of a typical wireless interface may be IEEE 802.15.

The processor 702 may use a power supply 712. The power supply 712 may be provided by an external source, such as a hardwired power supply or through power supplied through the same interface cable used by the output interface 710.

A calibration routine 714 may be used to create a set of offsets 716 that may be used by the position resolver 708 to map a force input 706 to a location with respect to a monitor display. The calibration routine 714 may be operable on the processor 702 or may be operated on a processor associated with a device to which a touchscreen adapter is attached.

A calibration routine 714 may generate a set of offsets 716 that may be stored in a flash memory storage device or other memory device. An example of a calibration routine is found in FIG. 8.

Figure 8:
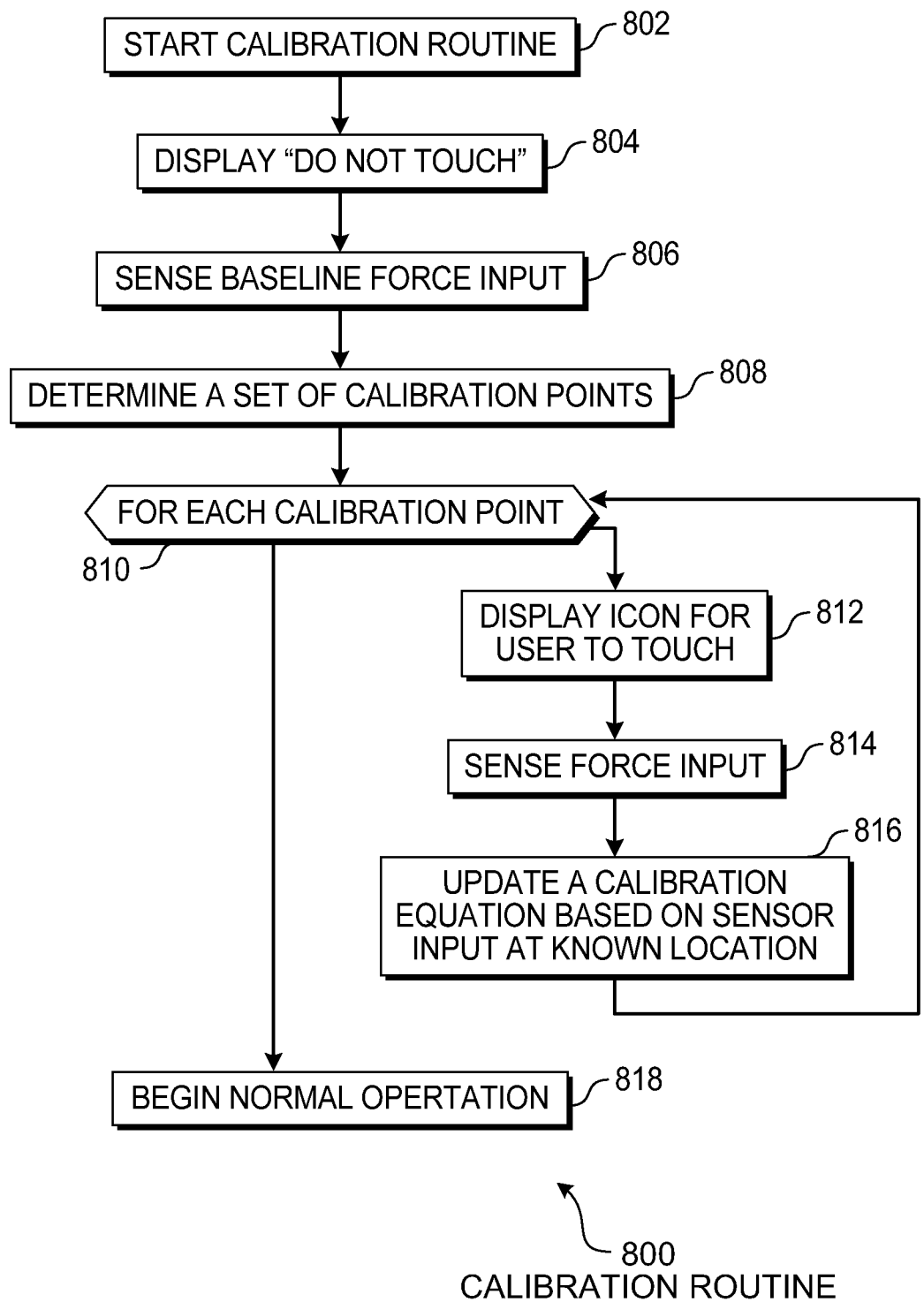
FIG. 8 is a flowchart illustration of an embodiment showing a calibration routine for a touchscreen adapter.

FIG. 8 is a flowchart illustration of an embodiment 800 showing a method for calibrating a touchscreen adapter. Embodiment 800 may take some baseline measurements, then instruct a user to touch an icon on a display so that the input from the touch may be correlated with the force input received by a touchscreen adapter.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The calibration routine may start in block 802.

A 'do not touch' message may be displayed on a monitor in block 804 and a baseline input force may be sensed in block 806. The baseline input force of block 806 may be different based on the size and position of a monitor attached to a touchscreen adapter. A heavier monitor may have a larger baseline input of force than a lighter monitor, and different monitor positions may also impart different baseline forces.

A set of calibration points may be determined in block 808. In some embodiments, the position of a touch may be described or approximated by a linear equation. As such, a set of calibration points may include four corners of a display and maybe some calibration points at or near the center of the display.

In some embodiments, the position of a touch may be described in a non-linear fashion. In such a case, the calibration points may be selected at various places across the display to enable an accurate generation of factors.

For each calibration point in block 810, an icon for a user to touch may be displayed in block 812 and the force input of a touch may be sensed in block 814. Based on knowing where on the display the icon is placed, a calibration equation may be updated in block 816. Each embodiment may use different mechanisms to resolve the position of a touch on a display. Some embodiments may use one mechanism for a vertical position determination and a different mechanism for a horizontal position determination.

In some embodiments, various mathematical mechanisms may be used to determine a calibration equation factor. In embodiments where the calibration equation is a linear function, two points may be used to generate initial factors and other points may be used to further refine the factors. In embodiments where the calibration equation is a non-linear function, multiple points may be used to determine an equation using various curve fitting techniques.

As the factors are updated, the factors may be stored and the process may return to block 810.

After all the calibration points are processed in block 810, normal operation of the touchscreen adapter may proceed in block 818.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A touchscreen adapter for converting a monitor to a touchscreen input device, said monitor having a horizontal display axis and a vertical display axis, said monitor having a monitor-side mechanical interface for coupling to a matched mount-side mechanical interface on a monitor mount, the touchscreen adapter comprising:

a monitor-facing mechanical interface for coupling to said monitor-side mechanical interface of said monitor, said monitor-facing mechanical interface having the same gender as said mount-side mechanical interface;

a mount-facing mechanical interface for coupling to said mount-side mechanical interface on said monitor mount, said mount-facing mechanical interface having the same gender as said monitor-side mechanical interface; and a mechanical framework situated between said monitor-facing mechanical interface and said mount-facing mechanical interface, the mechanical framework including a monitor-side plate closer to said monitor-facing mechanical interface and a mount-side plate closer to said mount-facing mechanical interface, and further including:
one or more components configured to resolve a position of a touch on said monitor with respect to said horizontal display axis and said vertical display axis based on a difference in sensed force between said monitor-side plate and said mount-side plate when said touch is detected; and
an output interface configured to transmit said position of said touch.

2. The touchscreen adapter of claim 1, said monitor-facing mechanical interface being configured to articulate with respect to said mount-facing mechanical interface.

3. The touchscreen adapter of claim 2, said measurement sensor comprising a plurality of strain gages.

4. The touchscreen adapter of claim 2, said measurement sensor comprising at least one displacement sensor.

5. The touchscreen adapter of claim 4, said measurement sensor comprising a first displacement sensor configured to measure along said horizontal display axis and a second displacement sensor configured to measure along said vertical display axis.

6. The touchscreen adapter of claim 1, said monitoring-facing mechanical interface conforming at least in part to a first standard interface.

7. The touchscreen adapter of claim 6, said first standard interface conforming at least in part to a Video Electronics Standards Association standard.

8. The touchscreen adapter of claim 6, said mount-facing mechanical interface conforming at least in part to a second standard interface.

9. The touchscreen adapter of claim 8, said first standard interface and said second standard interface being the same standard.

10. The touchscreen adapter of claim 8, said first standard interface and said second standard interface being a different standard.

11. The touchscreen adapter of claim 1, said mount-facing mechanical interface being larger than said monitor-facing mechanical interface.

12. The touchscreen adapter of claim 1, said mount-facing mechanical interface being smaller than said monitor-facing mechanical interface.

13. The touchscreen adapter of claim 1, said mount-facing mechanical interface being the same size as said monitor-facing mechanical interface.

14. The touchscreen adapter of claim 1, said monitor-facing mechanical interface comprising a male connection.

15. The touchscreen adapter of claim 1, said monitor-facing mechanical interface having a horizontal interface size, said monitor having a horizontal monitor size at least two times larger than said horizontal interface size.

16. A touchscreen adapter for converting a monitor to a touchscreen input device, said monitor having a display surface with a horizontal display axis and a vertical display axis, said monitor having a monitor-side mechanical interface for coupling to a matched mount-side mechanical interface on a monitor mount, the touchscreen adapter comprising:
a monitor-facing mechanical interface for coupling to said monitor-side mechanical interface of said monitor, said monitor-facing mechanical interface having the same gender as said mount-side mechanical interface;
a mount-facing mechanical interface for coupling to said mount-side interface of said monitor mount, said mount-facing mechanical interface having the same gender as said monitor-side mechanical interface; and
a mechanical framework situated between said monitor-facing mechanical interface and said mount-facing mechanical interface, the mechanical framework including a monitor-side plate closer to said monitor-facing mechanical interface and a mount-side plate closer to said mount-facing mechanical interface, said monitor-side plate and said mount-side plate mechanical joined together, said monitor-side plate including fasteners for connecting to the monitor, and further including:
one or more electronic components configured to resolve a position of a touch on said display surface with respect to said horizontal display axis and said vertical display axis based on a difference in sensed force change between said monitor-side plate and said mount-side plate when said touch is detected; and
an output interface configured to transmit said position of said touch.

17. The touchscreen adapter of claim 16, said output interface being a hardwired communications interface.

18. The touchscreen adapter of claim 16, said output interface being a wireless communications interface.

19. A touchscreen adapter for converting a monitor to a touchscreen input device, said monitor having a horizontal display axis and a vertical display axis, said monitor having a female monitor-side mechanical interface for coupling to a matched male mount-side mechanical interface on a monitor mount, the touchscreen adapter comprising:
a monitor-facing mechanical interface for coupling to said monitor-side mechanical interface of said monitor, said monitor-facing mechanical interface having the same gender as said male mount-side mechanical interface;
a mount-facing mechanical interface for coupling to said mount-side interface of said monitor mount, said mount-facing mechanical interface having the same gender as said female monitor-side mechanical interface; and
a mechanical framework situated between said monitor-facing mechanical interface and said mount-facing mechanical interface, the mechanical framework including a monitor-side plate closer to said monitor-facing mechanical interface and a mount-side plate closer to said mount-facing mechanical interface, said monitor-side plate and said mount-side plate mechanical joined together, said monitor-side plate including fasteners for connecting to the monitor, said monitor-side plate also including a plurality of arms, and further including:
a strain gauge mounted on each of said plurality of arms for capturing a deflection between said monitor-side plate and said mount-side plate in response to a touch on said monitor;
a one or more electronic components configured to resolve a position of said touch on said monitor with respect to said horizontal display axis and said vertical display axis based on said captured deflection when said touch is detected; and
an output interface configured to transmit said position of said touch.

20. The touchscreen adapter of claim 19, wherein said monitor-facing mechanical interface further includes one or more tabs for engaging with recesses on said monitor; and
wherein said mount-facing mechanical interface further includes one or more tab receptacles for engaging with tabs similar on said monitor mount, said tabs on said monitor mount similar to the one or more tabs.

* * * * *